(12) United States Patent
Morimoto et al.

(10) Patent No.: US 9,634,320 B2
(45) Date of Patent: Apr. 25, 2017

(54) ACTIVE MATERIAL AND LITHIUM ION BATTERY

(71) Applicants: NATIONAL UNIVERSITY CORPORATION GUNMA UNIVERSITY, Gunma (JP); TOYOTA JIDOSHA KABUSHIKI KAISHA, Aichi (JP)

(72) Inventors: Hideyuki Morimoto, Midori (JP); Shin-ichi Tobishima, Maebashi (JP); Yohei Shindo, Toyota (JP)

(73) Assignees: NATIONAL UNIVERSITY CORPORATION GUNMA UNIVERSITY, Maebashi-shi (JP); TOYOTA JIDOSHA KABUSHIKI KAISHA, Toyota (JP)

(\*) Notice: Subject to any disclaimer, the term of this patent is extended or adjusted under 35 U.S.C. 154(b) by 0 days.

(21) Appl. No.: 14/763,801

(22) PCT Filed: Dec. 25, 2013

(86) PCT No.: PCT/JP2013/084731
§ 371 (c)(1),
(2) Date: Jul. 27, 2015

(87) PCT Pub. No.: WO2014/119205
PCT Pub. Date: Aug. 7, 2014

(65) Prior Publication Data
US 2015/0357639 A1    Dec. 10, 2015

(30) Foreign Application Priority Data

Jan. 30, 2013  (JP) ................................. 2013-015657

(51) Int. Cl.
*H01M 4/36* (2006.01)
*H01M 4/58* (2010.01)
*H01M 10/0525* (2010.01)
*H01G 11/06* (2013.01)
*H01G 11/30* (2013.01)
*H01G 11/50* (2013.01)

(52) U.S. Cl.
CPC ............ *H01M 4/366* (2013.01); *H01G 11/06* (2013.01); *H01G 11/30* (2013.01); *H01G 11/50* (2013.01);
(Continued)

(58) Field of Classification Search
CPC ......... H01G 11/06; H01G 11/30; H01M 4/36; H01M 4/505; H01M 4/525; H01M 4/62;
(Continued)

(56) References Cited

U.S. PATENT DOCUMENTS

2004/0202935 A1   10/2004   Barker et al.
2009/0305141 A1   12/2009   Lee et al.
(Continued)

FOREIGN PATENT DOCUMENTS

CN    1795514 A       6/2006
JP    2006-036545 A   2/2006
(Continued)

OTHER PUBLICATIONS

Mar. 4, 2014 International Search Report issued in International Application No. PCT/JP2013/084731.

*Primary Examiner* — Emily Le
*Assistant Examiner* — Monique Wills

(57) ABSTRACT

An active material used for an electrochemical device utilizing Li ion conduction, and capable of improving cycle stability. The object is attained by providing an active material used for an electrochemical device utilizing Li ion conduction, including an active substance capable of absorbing and releasing a Li ion, and an Na ion conductor disposed on the surface of the active substance and having a polyanionic structure.

14 Claims, 7 Drawing Sheets

(52) U.S. Cl.
CPC ..... *H01M 4/5825* (2013.01); *H01M 10/0525* (2013.01); *H01M 2220/20* (2013.01); *H01M 2220/30* (2013.01); *Y02E 60/122* (2013.01); *Y02E 60/13* (2013.01)

(58) Field of Classification Search
CPC ............... H01M 4/366; H01M 4/5825; H01M 10/0525; Y02E 60/13
See application file for complete search history.

(56) References Cited

U.S. PATENT DOCUMENTS

| | | |
|---|---|---|
| 2011/0086266 A1 | 4/2011 | Kondo |
| 2012/0301786 A1 | 11/2012 | Takamuku et al. |
| 2013/0059211 A1 | 3/2013 | Schaefer et al. |
| 2014/0159668 A1* | 6/2014 | Whitacre ............... H01G 11/50 320/130 |
| 2014/0349166 A1 | 11/2014 | Chiga et al. |

FOREIGN PATENT DOCUMENTS

| | | |
|---|---|---|
| JP | 2006-523176 A | 10/2006 |
| JP | 2008-226463 A | 9/2008 |
| JP | 2009-529762 A | 8/2009 |
| JP | 2012-003928 A | 1/2012 |
| JP | 2012-099323 A | 5/2012 |
| JP | 2012-142154 A | 7/2012 |
| WO | 2004/095607 A2 | 11/2004 |
| WO | 2011/113515 A1 | 9/2011 |
| WO | 2013/080722 A1 | 6/2013 |

\* cited by examiner

5000 TIMES          10000 TIMES

ACTIVE MATERIAL AND LITHIUM ION BATTERY

TECHNICAL FIELD

The present invention relates to an active material which is used for an electrochemical device utilizing Li ion conduction, and capable of improving cycle stability.

BACKGROUND ART

In accordance with a rapid spread of information relevant apparatuses and communication apparatuses such as a personal computer, a video camera and a portable telephone in recent years, the development of a battery excellent as a power source thereof has been emphasized. The development of a lithium ion battery as a battery used for an electric automobile or a hybrid automobile has been advanced, for example, in the automobile industry in the field except information relevant apparatuses and communication relevant apparatuses.

Such a lithium ion battery ordinarily has a cathode active material layer containing a cathode active substance, an anode active material layer containing an anode active substance, and an electrolyte layer formed between the cathode active material layer and the anode active material layer. For example, in Patent Literature 1, a lithium secondary battery, in which a cathode active material layer contains a cathode active substance having on a surface thereof solid powder containing primary particles including a crystalline or amorphous lithium ion conductive solid electrolyte, is described. Also, examples of the crystalline or amorphous lithium ion conductive solid electrolyte include a nasicon-type phosphoric acid compound represented by a general formula $Li_{1+x}Al_xM_{2-x}(PO_4)_3$ (M is at least one kind selected from the group consisting of Ti, Ge and Ze, and $0 \leq x \leq 1$). Also, in Patent Literature 2, an electrode, on which a porous active layer formed out of a mixture having many inorganic particles is coated, is disclosed. Examples of these inorganic particles include a general formula $Li_xAl_yTi_z(PO_4)_3$ ($0 < x < 2$, $0 < y < 1$, $0 < z < 3$).

CITATION LIST

Patent Literature

Patent Literature 1: Japanese Patent Application Publication (JP-A) No. 2008-226463
Patent Literature 2: Japanese Translation of PCT International Application (JP-A) No. 2009-529762

SUMMARY OF INVENTION

Technical Problem

For example, an active material in which a Li ion conductor is disposed on the surface of an active substance is occasionally used in a lithium ion battery from the viewpoint of, such as, securing a conducting path of a Li ion as a conducting ion (such as Patent Literature 1). The improvement of cycle stability is further demanded in a lithium ion battery using such an active material. The present invention has been made in view of the actual circumstances, and the main object thereof is to provide an active material which is used for an electrochemical device utilizing Li ion conduction, and capable of improving cycle stability.

Solution to Problem

In order to solve the problems, the present invention provides an active material used for an electrochemical device utilizing Li ion conduction, comprising an active substance capable of absorbing and releasing a Li ion, and an Na ion conductor disposed on the surface of the active substance and having a polyanionic structure.

According to the present invention, the disposition of a specific Na ion conductor on the surface of the active substance allows the active material capable of improving cycle stability of an electrochemical device utilizing Li ion conduction.

In the invention, the Na ion conductor is preferably represented by a general formula $Na_{1-w}Li_wM^1{}_xM^2{}_{2-x}(AO_y)_z$ ($M^1$ is at least one kind of Al, Fe, In, Cr, Sc, Ga, La and Y; $M^2$ is at least one kind of Ti, Zr, Ge, Sn and Hf; A is at least one kind of P, Si, Ti, V, W and Nb; and $0 \leq x \leq 1$, $0 < y$, $0 < z$, and $0 \leq w < 1$). The reason therefor is to allow the effect of the present invention to be further performed.

In the invention, the Na ion conductor is preferably provided with a nasicon-type crystal phase. The reason therefor is that the nasicon-type crystal phase is so favorable in stability in the air as to have the advantage that higher capacity may be further intended.

Also, the present invention provides an electrochemical device comprising the active material described above.

According to the present invention, the use of the active material described above allows cycle stability of an electrochemical device to be improved.

In the invention, the electrochemical device is preferably a lithium ion battery.

Advantageous Effects of Invention

An active material of the present invention produces the effect such as to be used for an electrochemical device utilizing Li ion conduction, and capable of improving cycle stability.

DESCRIPTION OF EMBODIMENTS

An active material and an electrochemical device of the present invention are hereinafter described in detail.

A. Active Material

First, an active material of the present invention is described. The active material of the present invention is an active material used for an electrochemical device utilizing Li ion conduction, comprising an active substance capable of absorbing and releasing a Li ion, and an Na ion conductor disposed on the surface of the active substance and having a polyanionic structure.

Figure 1:
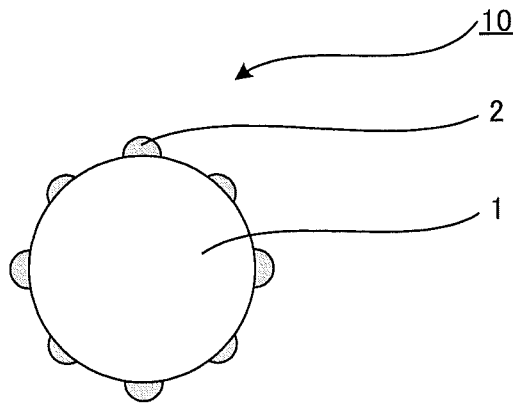
FIG. 1 is a schematic cross-sectional view showing an example of an active material of the present invention.

FIG. 1 is a schematic cross-sectional view showing an example of the active material of the present invention. As exemplified in FIG. 1, an active material 10 of the present invention comprises an active substance 1 capable of absorbing and releasing a Li ion, and an Na ion conductor 2 disposed on the surface of the active substance 1. Also, the Na ion conductor 2 has a polyanionic structure.

According to the present invention, the disposition of a specific Na ion conductor on the surface of the active substance allows the active material capable of improving cycle stability of an electrochemical device utilizing Li ion conduction. The reason to be capable of improving cycle stability is guessed as follows. That is to say, the Na ion conductor in the present invention has a polyanionic structure, so as to have the advantage that the elution of the component of the active substance (such as transition metallic element) may be prevented. Specifically, a polyanionic structure (such as $PO_4$ structure) is conceived to partly raise electric potential on the surface of the active substance by the inductive effect, and to allow valence number of the component of the active substance (such as tetravalent Mn) to be restrained from decreasing. As a result, it is conceived that the elution of the component of the active substance may be restrained and the deterioration of the active substance may be restrained, so as to contribute to the improvement of cycle stability. Accordingly, it may be guessed that the effect of the present invention is obtained in the case of amorphia as well as crystal.

Also, in the present invention, the case where the Na ion conductor is provided with a crystal phase having a polyanionic structure (such as a nasicon-type crystal phase) brings the advantage that higher capacity may be intended. Generally, the addition of an ion conductor (such as an inorganic oxide) on the surface of the active substance deteriorates the surface reactivity of the active substance to raise resistance. On the contrary, in the present invention, it is conceived that the disposition of a specific Na ion conductor on the surface of the active substance brings the effect of decreasing activation energy for lithium ion migration on the surface of the active substance particles. It is guessed that this effect is brought by lithium ion migration while utilizing the defect (the failure) of a crystal structure including Na ions with a large ionic radius. Incidentally, a space-charge layer model in regard to the improvement of conductivity produced at an ion conductor interface by inorganic filler addition is known, and a possibility is conceivable that lithium ion migration on the surface of the active substance becomes smooth by the same mechanism as this model.

In addition, ordinarily, in the case of producing an active material used for an electrochemical device utilizing Li ion conduction, it is conceived that a Li ion conductor is disposed on the surface of an active substance in consideration of securing a conducting path of a Li ion (such as Patent Literature 1). That is to say, the disposition of a Li ion conductor on the surface of the active substance allows only Li ions to be selectively conducted, so that a conducting path of Li ions may be sufficiently secured. On the contrary, although the active material of the present invention is an active material used for an electrochemical device utilizing Li ion conduction, an Na ion conductor is specially disposed on the surface of the active substance. Patent Literatures 1 and 2 offer no description about such a constitution.

The active material of the present invention is hereinafter described in each constitution.

1. Na Ion Conductor

An Na ion conductor in the active material of the present invention is disposed on the surface of the after-mentioned active substance and has a polyanionic structure. Here, the polyanionic structure is ordinarily composed of a central element covalently bonded to plural oxygen elements. The central element and the oxygen elements are covalently bonded, so that electrochemical stability may be increased.

The central element contained in the polyanionic structure is not particularly limited if the central element is such as to be capable of forming the polyanionic structure, but examples thereof include P, Si, Ti, V, W and Nb, preferably P, Si, Ti and V among them, more preferably P.

The polyanionic structure in the present invention is not particularly limited if the polyanionic structure is composed of the central element and the plural oxygen elements, but specific examples thereof include $PO_4$, $SiO_4$, $TiO_4$, $VO_4$, $WO_4$ and $NbO_4$, preferably $PO_4$ among them.

The Na ion conductor is ordinarily provided with a cation except the polyanionic structure described above. Here, the Na ion conductor is preferably provided with at least an Na ion as a cation by reason of having Na ion conductivity. That is to say, the Na ion conductor may have only an Na ion, or an Na ion and a Li ion as the cation. It is conceived that a Li ion migrates more easily at the interface for the reason that the Na ion conductor contains a Li ion in some degree.

The Na ion conductor in the present invention is not particularly limited if the Na ion conductor has the polyanionic structure described above. Examples of a composition of such an Na ion conductor include a general formula $Na_{1-w}Li_wM^1{}_xM^2{}_{2-x}(AO_y)_z$ ($M^1$ is at least one kind of Al, Fe, In, Cr, Sc, Ga, La and Y; $M^2$ is at least one kind of Ti, Zr, Ge, Sn and Hf; A is at least one kind of P, Si, Ti, V, W and Nb; and $0 \leq x \leq 1$, $0 < y$, $0 < z$, and $0 \leq w < 1$).

A included in the general formula $Na_{1-w}Li_wM^1{}_xM^2{}_{2-x}(AO_y)_z$ is ordinarily at least one kind of P, Si, Ti, V, W and Nb, preferably at least one kind of P, Si, Ti and V among them, more preferably P. Incidentally, "y" in the general formula is properly determined in accordance with kinds of A as the central element, and is ordinarily a larger value than 0. Also, "z" in the general formula is properly determined in accordance with factors such as kinds of $AO_y$, $M^1$ and $M^2$, and is ordinarily a larger value than 0.

Also, $M^1$ included in the general formula $Na_{1-w}Li_wM^1{}_xM^2{}_{2-x}(AO_y)_z$ is ordinarily at least one kind of Al, Fe, In, Cr, Sc, Ga, La and Y, preferably at least one kind of Al, In and Fe among them, more preferably Al.

Also, $M^2$ included in the general formula $Na_{1-w}Li_wM^1{}_xM^2{}_{2-x}(AO_y)_z$ is ordinarily at least one kind of Ti, Zr, Ge, Sn and Hf, preferably at least one kind of Ti, Zr and Ge among them, more preferably Ti.

Also, the $M^1$ and $M^2$ are not particularly limited if each of them is at least one kind of the elements described above, but they are preferably a combination of Al and Ti and a combination of Al and Zr, for example.

The ratio of $M^1$ and $M^2$ in the general formula is represented by $M^1:M^2=x:2-x$ (molar ratio). A value of the "x" is ordinarily 0 or more. Also, a value of the "x" is ordinarily 1 or less, preferably 0.8 or less above all, more preferably 0.6 or less, far more preferably 0.4 or less.

Also, in the case where the Na ion conductor has an Na ion and a Li ion as the cation (the case of a mixed cation system), "w" in the general formula is not particularly limited if it is ordinarily within a range of 0<w<1.

Other examples of a composition of the Na ion conductor in the present invention include a general formula $Li_{3-w}Na_wM^1{}_xM^2{}_{2-x}(AO_y)_z$ ($M^1$ is at least one kind of Al, Fe, In, Cr, Sc, Ga, La and Y; $M^2$ is at least one kind of Ti, Zr, Ge, Sn and Hf; A is at least one kind of P, Si, Ti, V, W and Nb; and $0 \leq x \leq 1$, $0<y$, $0<z$, and $0<w \leq 3$).

The Na ion conductor in the present invention has the polyanionic structure, and may be a crystal or an amorphia. Incidentally, the so-called glass-ceramics are also included in the Na ion conductor. Also, the Na ion conductor is not particularly limited if the Na ion conductor has the polyanionic structure, but is preferably provided with a crystal phase having the polyanionic structure above all, and it is more preferable that the ratio of the crystal phase is large. Specifically, the Na ion conductor preferably contains the crystal phase mainly. Here, "containing the crystal phase having the polyanionic structure mainly" signifies that the ratio of the crystal phase having the polyanionic structure is the largest in all crystal phases contained in the Na ion conductor. The ratio of the crystal phase contained in the Na ion conductor is preferably 50 mol % or more, more preferably 60 mol % or more, and far more preferably 70 mol % or more. Also, the Na ion conductor may be such as to be composed of only the crystal phase (a single phase). Incidentally, the ratio of the crystal phase may be determined by a quantitative analysis method through X-ray diffraction (such as a quantification method by R-value and a Rietveld method).

Also, in the present invention, the crystal phase having the polyanionic structure is preferably a nasicon-type crystal phase. The reason therefor is that the nasicon-type crystal phase has the advantage that stability in the air is favorable. Examples of the nasicon-type crystal phase include a crystal phase represented by a general formula $Na_{1-w}Li_wM^1{}_xM^2{}_{2-x}(AO_y)_z$. Also, the Na ion conductor may have a crystal phase represented by a general formula $Li_{3-w}Na_wM^1{}_xM^2{}_{2-x}(AO_y)_z$. Incidentally, kinds of A, $M^1$ and $M^2$, numerical value ranges of "x", "y", "z" and "w", and preferable examples thereof in these general formulae are the same as the contents described above.

Also, the Na ion conductor in the present invention may have another crystal phase except the nasicon-type crystal phase. Examples of another crystal phase include an olivine-type crystal phase and a cristobalite-type crystal phase.

The Na ion conductor in the present invention has Na ion conductivity. Specifically, the Na ion conductor preferably has an Na ion conductance of $10^{-5}$ S/cm or more. Also, the Na ion conductor in the present invention preferably has Li ion conductivity further. The reason therefor is that it is conceived that Li ion migration becomes smoother.

The shape of the Na ion conductor in the present invention is not particularly limited if the shape is a shape capable of being disposed on the surface of the after-mentioned active substance, but examples thereof include a particulate shape and a thin-filmy shape. Also, in the case where the Na ion conductor is in a particulate shape, the average particle diameter thereof is not particularly limited if the average particle diameter is such as to be capable of being disposed on the surface of the after-mentioned active substance, but the average particle diameter is, for example, preferably within a range of 0.1 μm to 2 μm, more preferably within a range of 0.2 μm to 1 μm, particularly preferably within a range of 0.3 μm to 0.8 μm.

A method for synthesizing the Na ion conductor in the present invention is not particularly limited if the method is such as to allow the Na ion conductor described above. Examples thereof include a method for preparing a raw material mixture, in which starting materials such as an Na source, an $M^1$ source, an $M^2$ source and an A source are mixed at a predetermined ratio, to subject the raw material mixture to mechanical milling treatment, and a method for further heat-treating after mechanical milling treatment.

2. Active Substance

An active substance in the present invention is not particularly limited if the active substance is such as to be capable of absorbing and releasing a Li ion. The active substance in the present invention may be a cathode active substance or an anode active substance. Incidentally, the cathode active substance and the anode active substance are not definitely distinguished, and charge-discharge potential of two kinds of active substances may be compared to use the active substance exhibiting a noble potential and the active substance exhibiting a base potential for a cathode and an anode, respectively. Also, the active substance in the present invention is preferably an oxide active substance above all. The reason therefor is to allow a high-capacity active material.

Specific examples of the active substance in the present invention include lithium cobaltate ($LiCoO_2$), lithium nickelate ($LiNiO_2$), $LiNi_{1/3}Mn_{1/3}Co_{1/3}O_2$, lithium manganate ($LiMn_2O_4$), heterogeneous element substitution LiMn spinel represented by $Li_{1+x}Mn_{2-x-y}M_yO_4$ (x+y=2, M=at least one kind selected from Al, Mg, Co, Fe, Ni and Zn), lithium titanate (an oxide containing Li and Ti), lithium metal phosphate ($LiMPO_4$, M=at least one kind selected from Fe, Mn, Co and Ni), transition metal oxide (such as vanadium oxide ($V_2O_5$) and molybdenum oxide ($MoO_3$)), titanium sulfide ($TiS_2$), carbon material (such as graphite and hard carbon), lithium cobalt nitride (LiCoN), lithium silicon oxide (an oxide containing Li and Si), lithium metal (Li), lithium alloy (such as LiM; M=Sn, Si, Al, Ge, Sb and P), lithium storable intermetallic compound (such as storable intermetallic compound containing Mg and M; M=Sn, Ge and Sb, and storable intermetallic compound containing N and Sb; N=In, Cu and Mn), and derivatives thereof.

The ratio of the active substance and the Na ion conductor is not particularly limited, but the ratio of the Na ion conductor to the active substance is preferably within a range of 0.1% by weight to 30% by weight, for example.

Examples of the shape of the active substance in the present invention include a particulate shape. Also, the average particle diameter thereof ($D_{50}$) is preferably, for example, within a range of 500 nm to 100 μm, above all, within a range of 1 μm to 20 μm.

3. Active Material

An active material of the present invention is not particularly limited if the active material is such that the Na ion conductor described above is disposed on the surface of the active substance described above, but may be such that the Na ion conductor coats the surface of the active substance, or such that the Na ion conductor does not coat the surface of the active substance to merely contact the surface.

In the case where the active material of the present invention is such that the Na ion conductor coats the surface of the active substance, the Na ion conductor preferably coats the surface of the active substance while the particles of the Na ion conductor are attaching to the surface of the active substance. The ratio of the Na ion conductor to the active substance is preferably within a range of 0.1% by weight to 20% by weight, for example.

Also, the active material of the present invention may be such that the Na ion conductor described above does not coat the surface of the active substance to merely contact the surface. Such an active material may be obtained by merely mixing the Na ion conductor and the active substance. The ratio of the Na ion conductor to the active substance is preferably within a range of 0.1% to 30%, for example.

Also, examples of a method for forming the active material include mixing by a ball mill and mixing by an agate mortar.

The active material of the present invention is ordinarily used for an electrochemical device utilizing Li ion conduction. The present invention provides an electrochemical device comprising the active material described above. Such an electrochemical device is described in detail in the item of "B. Electrochemical device".

B. Electrochemical Device

Next, an electrochemical device of the present invention is described. The electrochemical device of the present invention comprises the active material described in the item of the "A. Active material". Also, the electrochemical device of the present invention ordinarily utilizes Li ion conduction, and examples thereof include a lithium ion battery, a lithium ion capacitor and a sensor. The specific constitution of such an electrochemical device is the same as the constitution of a general electrochemical device. Also, in the present invention, the electrochemical device is preferably a lithium ion battery.

A lithium ion battery as an aspect of the electrochemical device of the present invention is hereinafter described.

The lithium ion battery of the present aspect is a lithium ion battery comprising a cathode active material layer containing a cathode active substance, an anode active material layer containing an anode active substance, and an electrolyte layer formed between the cathode active material layer and the anode active material layer, characterized in that at least one of the cathode active material layer and the anode active material layer contains the active material described above.

Figure 2:
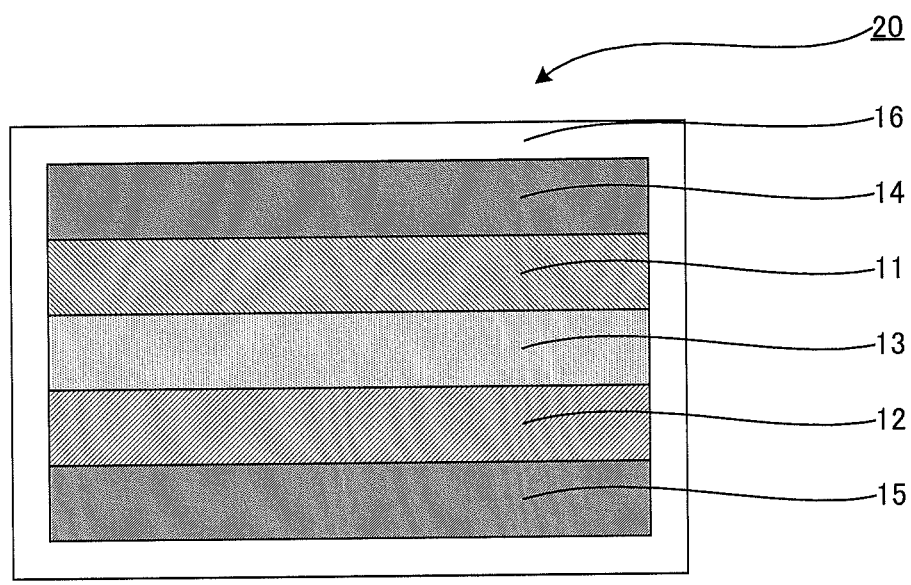
FIG. 2 is a schematic cross-sectional view showing an example of an electrochemical device of the present invention.

FIG. 2 is a schematic cross-sectional view showing an example of the electrochemical device of the present invention. As shown in FIG. 2, a lithium ion battery 20 as an aspect of the electrochemical device comprises a cathode active material layer 11, an anode active material layer 12, an electrolyte layer 13 formed between the cathode active material layer 11 and the anode active material layer 12, a cathode current collector 14 for collecting the cathode active material layer 11, an anode current collector 15 for collecting the anode active material layer 12, and a battery case 16 for storing these members. The lithium ion battery 20 is characterized in that at least one of the cathode active material layer 11 and the anode active material layer 12 contains the active material described in the item of the "A. Active material".

According to the present aspect, at least one of the cathode active material layer and the anode active material layer contains the active material described above, so that cycle stability of the lithium ion battery may be improved.

The lithium ion battery of the present aspect is hereinafter described in each constitution.

1. Cathode Active Material Layer

The cathode active material layer in the present aspect is a layer containing at least the cathode active substance. Also, the cathode active material layer may contain at least one of a conductive material, a binding material and a solid electrolyte material as required in addition to the cathode active substance.

The cathode active material layer in the present aspect preferably contains the active material described in the item of the "A. Active material". The reason therefor is to allow cycle stability of the lithium ion battery to be improved. Also, for example, in the case where the anode active material layer contains the active material described above, the cathode active material layer may not contain the active material described above, and may be regarded as a cathode active material layer containing a cathode active substance used for a general lithium ion battery. The content of the cathode active substance in the cathode active material layer is, for example, preferably within a range of 10% by weight to 99% by weight, more preferably within a range of 20% by weight to 90% by weight.

The cathode active material layer in the present aspect may further contain a conductive material. Examples of the conductive material include a carbon material; specific examples thereof include acetylene black, Ketjen Black, carbon black, coke, carbon fiber and graphite. Also, the cathode active material layer in the present aspect may further contain a binding agent. The binding agent is not particularly limited if the binding agent is such as to be stable chemically and electrically, but examples thereof include fluorine-containing binding materials such as polyvinylidene fluoride (PVdF) and polytetrafluoroethylene (PTFE), and rubber-based binding materials such as styrene-butadiene rubber (SBR). Also, the cathode active material layer in the present aspect may further contain a solid electrolyte material. The solid electrolyte material is not particularly limited if the material is such as to have desired ion conductivity, but examples thereof include an oxide solid electrolyte material and a sulfide solid electrolyte material. Incidentally, the solid electrolyte material is described in detail in the after-mentioned item of "3. Electrolyte layer".

The thickness of the cathode active material layer varies greatly with the constitution of an intended lithium ion battery, and is preferably within a range of 0.1 μm to 1000 μm, for example.

2. Anode Active Material Layer

The anode active material layer in the present aspect is a layer containing at least the anode active substance. Also, the anode active material layer may contain at least one of a conductive material, a binding material and a solid electrolyte material as required in addition to the anode active substance.

The anode active material layer in the present aspect may contain the active material described above. Also, in the case where the cathode active material layer contains the active material described above, the anode active material layer may be regarded as an anode active material layer used for a general lithium ion battery. Examples of the anode active substance used for such an anode active material layer include a metal active substance and a carbon active substance. Examples of the metal active substance include In, Al, Si, and Sn. On the other hand, examples of the carbon active substance include mesocarbon microbeads (MCMB), high orientation property graphite (HOPG), hard carbon, and soft carbon. Also, the content of the anode active substance in the anode active material layer is, for example, preferably within a range of 10% by weight to 99% by weight, more preferably within a range of 20% by weight to 90% by weight.

The conductive material, the binding material and the solid electrolyte material used for the anode active material layer are the same as the case of the cathode active material layer described above. Also, the thickness of the anode active material layer varies greatly with the constitution of the battery, and is preferably within a range of 0.1 μm to 1000 μm, for example.

3. Electrolyte Layer

Next, the electrolyte layer in the present aspect is described. The electrolyte layer in the present aspect is a layer formed between the cathode active material layer and the anode active material layer. The form of the electrolyte layer is not particularly limited but examples thereof include a liquid electrolyte layer, a gel electrolyte layer and a solid electrolyte layer.

The liquid electrolyte layer is ordinarily a layer obtained by using a nonaqueous liquid electrolyte. Also, the nonaqueous liquid electrolyte ordinarily contains a Li salt and a nonaqueous solvent. Examples of the Li salt include inorganic Li salts such as $LiPF_6$, $LiBF_4$, $LiClO_4$ and $LiAsF_6$; and organic Li salts such as $LiCF_3SO_3$, $LiN(CF_3SO_2)_2$, $LiN(C_2F_5SO_2)_2$, $LiN(FSO_2)_2$ and $LiC(CF_3SO_2)_3$. Also, the nonaqueous solvent is not particularly limited if the solvent is such as to dissolve the Li salt. Examples of the high-permittivity solvent include cyclic ester (cyclic carbonate) such as ethylene carbonate (EC), propylene carbonate (PC) and butylene carbonate (BC), γ-butyrolactone, sulfolane, N-methylpyrrolidone (NMP), and 1,3-dimethyl-2-imidazolidinone (DMI). On the other hand, examples of the low-viscosity solvent include chain ester (chain carbonate) such as dimethyl carbonate (DMC), diethyl carbonate (DEC) and ethyl methyl carbonate (EMC), acetate such as methyl acetate and ethyl acetate, and ether such as 2-methyltetrahydrofuran. A mixed solvent such that the high-permittivity solvent and the low-viscosity solvent are mixed may be used. Incidentally, in the present aspect, a low-volatile liquid such as an ionic liquid may be used as the nonaqueous liquid electrolyte.

The concentration of the Li salt in the liquid electrolyte is preferably, for example within a range of 0.3 mol/dm³ to 5 mol/dm³, above all within a range of 0.8 mol/dm³ to 1.5 mol/dm³. The reason therefor is that too low concentration of the Li salt brings a possibility of causing capacity reduction during high rate, whereas too high concentration of the Li salt brings a possibility of increasing viscosity to cause capacity reduction at low temperature.

The gel electrolyte layer may be obtained by adding and gelating a polymer to a nonaqueous liquid electrolyte, for example. Specifically, gelation may be performed by adding polymers such as polyethylene oxide (PEO), polyacrylonitrile (PAN) or polymethyl methacrylate (PMMA) to a nonaqueous liquid electrolyte.

The solid electrolyte layer is a layer obtained by using a solid electrolyte material. The solid electrolyte material is not particularly limited if the material is such as to have Li ion conductivity, but examples thereof include an oxide solid electrolyte material and a sulfide solid electrolyte material. Examples of the oxide solid electrolyte material include $Li_{1+x}Al_xGe_{2-x}(PO_4)_3$ (0≤x≤2), $Li_{1+x}Al_xTi_{2-x}(PO_4)_3$ (0≤x≤2), LiLaTiO (such as $Li_{0.34}La_{0.51}TiO_3$), LiPON (such as $Li_{2.9}PO_{3.3}N_{0.46}$) and LiLaZrO (such as $Li_7La_3Zr_2O_{12}$). On the other hand, examples of the sulfide solid electrolyte material include a $Li_2S$—$P_2S_5$ compound, a $Li_2S$—$SiS_2$ compound and a $Li_2S$—$GeS_2$ compound.

The solid electrolyte material in the present aspect may be amorphous or crystalline. Also, the shape of the solid electrolyte material is preferably a particulate shape. Also, the average particle diameter of the solid electrolyte material ($D_{50}$) is preferably, for example within a range of 1 nm to 100 μm, above all within a range of 10 nm to 30 μm.

The thickness of the electrolyte layer varies greatly with kinds of the electrolyte and constitutions of an intended lithium ion battery, and is preferably, for example within a range of 0.1 μm to 1000 μm, above all within a range of 0.1 μm to 300 μm.

4. Other Constitutions

The lithium ion battery of the present aspect comprises at least the cathode active material layer, anode active material layer and electrolyte layer described above, ordinarily further comprising a cathode current collector for collecting the cathode active material layer and an anode current collector for collecting the anode active material layer. Examples of a material for the cathode current collector include SUS, aluminum, nickel, iron, titanium and carbon. On the other hand, examples of a material for the anode current collector include SUS, copper, nickel and carbon. Also, examples of the shape of the cathode current collector and the anode current collector include a foil shape, a mesh shape and a porous shape.

The lithium ion battery of the present aspect may have a separator between the cathode active material layer and the anode active material layer. The reason therefor is to allow the battery with higher safety. Examples of a material for the separator include porous membranes such as polyethylene (PE), polypropylene (PP), cellulose and polyvinylidene fluoride; and nonwoven fabrics such as resin nonwoven fabric and glass fiber nonwoven fabric. Also, the separator may be a single-layer structure (such as PE and PP) or a laminated structure (such as PP/PE/PP). Also, a battery case of a general battery may be used for a battery case used for the present aspect. Examples of the battery case include a battery case made of SUS.

5. Lithium Ion Battery

The lithium ion battery of the present aspect may be a primary battery or a secondary battery, preferably a secondary battery among them. The reason therefor is to be repeatedly charged and discharged and be useful as a car-mounted battery, for example. Also, examples of the shape of the lithium ion battery of the present aspect include a coin shape, a laminate shape, a cylindrical shape and a rectangular shape. Also, a producing method for the lithium ion battery of the present aspect is not particularly limited if the method is a method which may produce the lithium ion battery described above.

Incidentally, the present invention is not limited to the embodiments. The embodiments are exemplification, and any is included in the technical scope of the present invention if it has substantially the same constitution as the technical idea described in the claim of the present invention and offers similar operation and effect thereto.

EXAMPLES

The present invention is described more specifically while showing examples hereinafter.

Synthesis Example 1

$Na_2CO_3$, $TiO_2$ and $P_2O_5$ were prepared as a starting material and mixed in a glove box filled with high-purity Ar to obtain a raw material mixture. Incidentally, they were mixed so that the ratio of Na, Ti and P in the raw material mixture was Na:Ti:P=1:2:3 (molar ratio). Put in a closed grinding vessel was 2.0 g of the obtained raw material mixture, and the vessel was mounted on a planetary ball milling apparatus (P-7™ manufactured by Fritsch Japan Co., Ltd.) to perform mechanical milling (MM) treatment and obtain a-NaTi$_2$(PO$_4$)$_3$ (a-NTP). Here, the MM treatment conditions were the number of weighing table revolutions of 450 rpm and 20 hours. Also, the capacity of the closed grinding vessel was 45 cc, the ball diameter was a diameter of 10 mm, and the number of the balls was 10 pieces. Also, the obtained a-NTP was heat-treated at a temperature of 850° C. for 2 hours to obtain c-NaTi$_2$(PO$_4$)$_3$ (c-NTP) (refer to FIG. 3).

Synthesis Example 2

Na$_2$CO$_3$, Li$_2$O, TiO$_2$ and P$_2$O$_5$ were prepared as a starting material and mixed in a glove box filled with high-purity Ar to obtain a raw material mixture. Incidentally, they were mixed so that the ratio of Li, Na, Ti and P in the raw material mixture was Li:Na:Ti:P=0.1:0.9:2:3 (molar ratio). Put in a closed grinding vessel was 2.0 g of the obtained raw material mixture, and the vessel was mounted on a planetary ball milling apparatus (P-7™ manufactured by Fritsch Japan Co., Ltd.) to perform MM treatment and obtain Li$_{0.1}$Na$_{0.9}$Ti$_2$(PO$_4$)$_3$ (heat-untreated). Here, the MM treatment conditions were the same as Synthesis Example 1. The obtained Li$_{0.1}$Na$_{0.9}$Ti$_2$(PO$_4$)$_3$ (heat-untreated) was heat-treated at a temperature of 850° C. for 2 hours to obtain Li$_{0.1}$Na$_{0.9}$Ti$_2$(PO$_4$)$_3$ (heat-treated).

Synthesis Example 3

Li$_2$O, Al$_2$O$_3$, TiO$_2$ and P$_2$O$_5$ were prepared as starting materials and mixed in a glove box filled with high-purity Ar to obtain a raw material mixture. Incidentally, they were mixed so that the ratio of Li, Al, Ti and P in the raw material mixture was Li:Al:Ti:P=1.3:0.3:1.7:3 (molar ratio). Put in a closed grinding vessel was 2.0 g of the obtained raw material mixture, and the vessel was mounted on a planetary ball milling apparatus (P-7™ manufactured by Fritsch Japan Co., Ltd.) to perform MM treatment and obtain Li$_{1.3}$Al$_{0.3}$Ti$_{1.7}$(PO$_4$)$_3$ (heat-untreated, a-LATP). Here, the MM treatment conditions were the same as Synthesis Example 1. The obtained a-LATP was heat-treated at a temperature of 850° C. for 2 hours to obtain Li$_{1.3}$Al$_{0.3}$Ti$_{1.7}$(PO$_4$)$_3$ (heat-treated, c-LATP).

[Evaluations 1]
(XRD Measurement)

X-ray diffraction (XRD) measurement by a CuKα ray was performed before and after heat treatment in each of Synthesis Examples 1 and 2. That is to say, each test sample was equally put in a sample holder for X-ray diffraction in the air, and measured by an X-ray diffraction instrument (Mini Flex™ manufactured by Rigaku Corporation). The measurement conditions are as follows. The results are shown in FIGS. 4 and 5.

X-ray source: CuKα ray (tube voltage: 30 kV, tube current: 15 mA)
Diffraction angle: 5°≤2θ≤80°
Scanning speed: 2°/min
Sampling width: 0.01°

Figure 4:
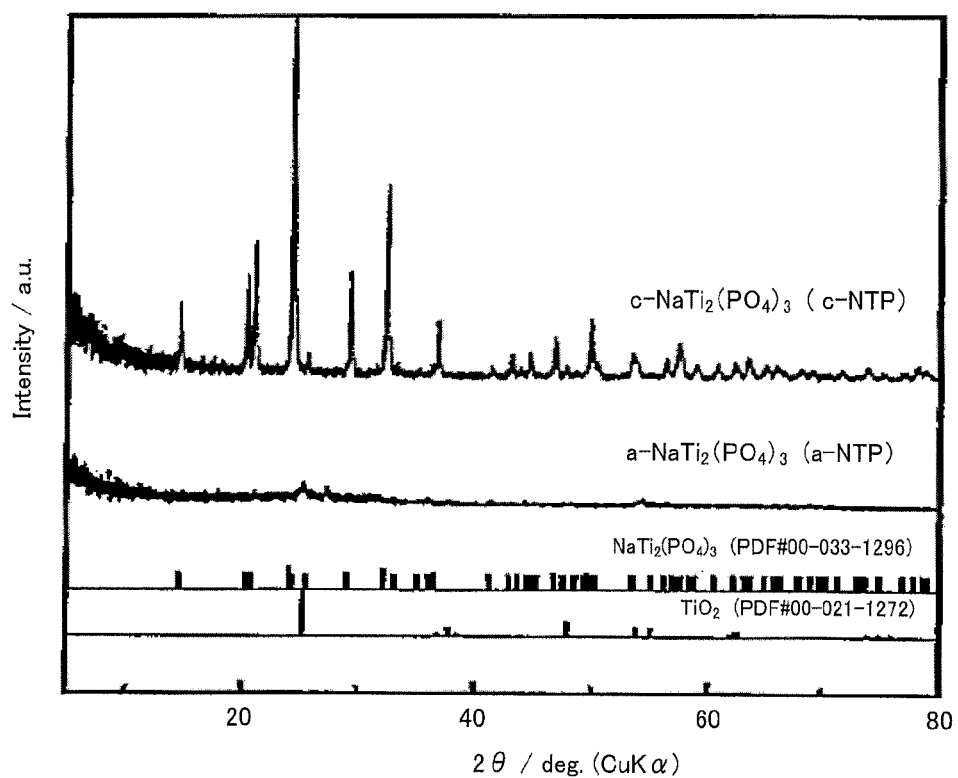
FIG. 4 is a result of measuring XRD of an Na ion conductor obtained in Synthesis Example 1.

It was confirmed from the results of FIG. 4 that the heat-untreated test sample after MM treatment was amorphous a-NaTi$_2$(PO$_4$)$_3$ (a-NTP). Incidentally, it is conceived that the small peak in XRD pattern of the heat-untreated test sample is derived from TiO$_2$ as a starting material. Also, in XRD pattern of the test sample after heat treatment, a peak was confirmed in the same position as c-NaTi$_2$(PO$_4$)$_3$ (c-NTP) as a nasicon-type compound. Thus, it was confirmed that the heat treatment of a-NTP allowed c-NTP to be formed.

Figure 5:
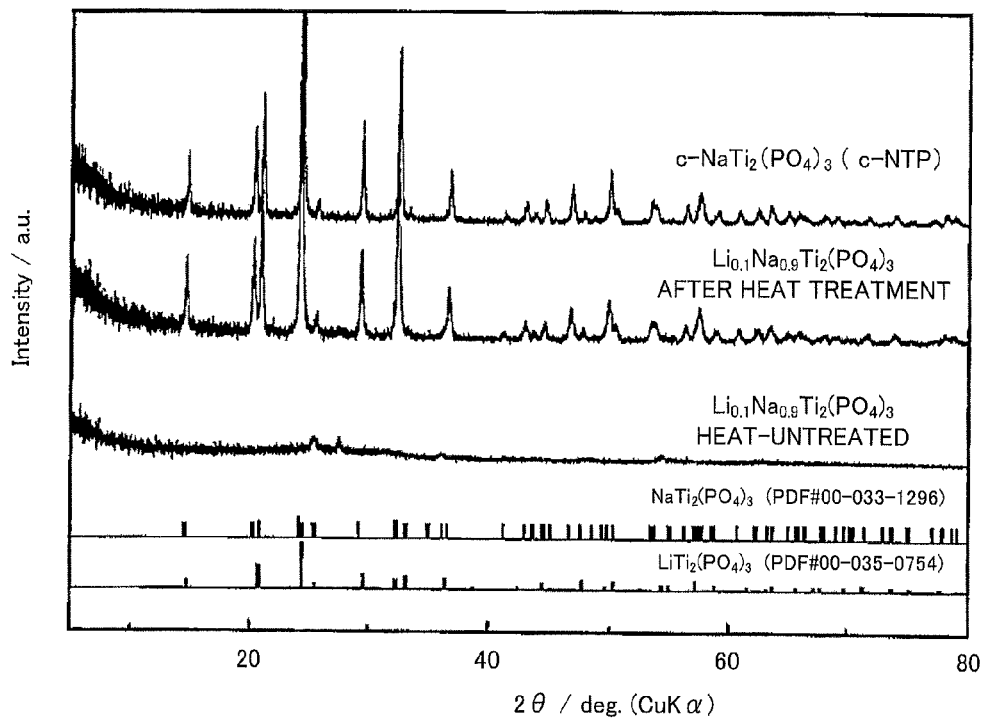
FIG. 5 is a result of measuring XRD of an Na ion conductor obtained in Synthesis Example 2.

Also, from the results of FIG. 5, with regard to the test sample (Li$_{0.1}$Na$_{0.9}$Ti$_2$(PO$_4$)$_3$) after heat treatment, a peak was confirmed in the same position as XRD pattern of the test sample after heat treatment obtained in Synthesis Example 1, that is, c-NTP. Thus, it is conceived that a compound having the same crystal structure as c-NTP, namely, a nasicon-type crystal structure was formed.

(Thermogravimetric Differential Thermal Analysis)

The heat-untreated test sample (a-NTP) obtained in Synthesis Example 1 was put in a platinum pan vessel to perform thermogravimetric differential thermal analysis (TG-DTA) in an open system by using a differential-type differential thermal balance (Thermo Plus 2 series TG8120™ manufactured by Rigaku Corporation). The measurement conditions are as follows. The results are shown in FIG. 6.

Reference: alumina (Al$_2$O$_3$)
Rate of temperature rise: 10° C./min (flow at 350 mL/min of air)
Measured temperature range: room temperature to 1000° C.

Figure 6:
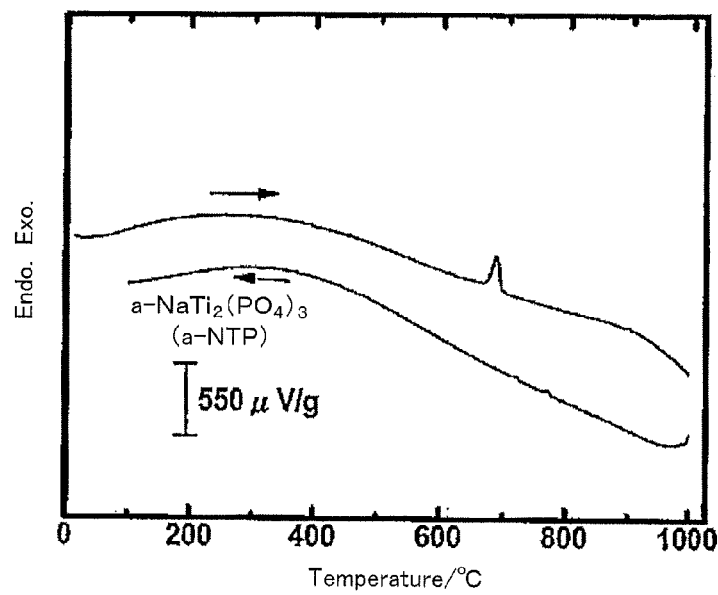
FIG. 6 is a result of thermogravimetric-differential thermal analysis (TG-DTA) of a-$NaTi_2(PO_4)_3$ (a-NTP) obtained in Synthesis Example 1.

As shown in FIG. 6, an exothermic peak was observed in the vicinity of 670° C. from the differential thermal analysis (DTA) curve. It is conceived from this exothermic peak that a-NTP causes crystal formation in the vicinity of 670° C.

(SEM Observation)

Figure 7:
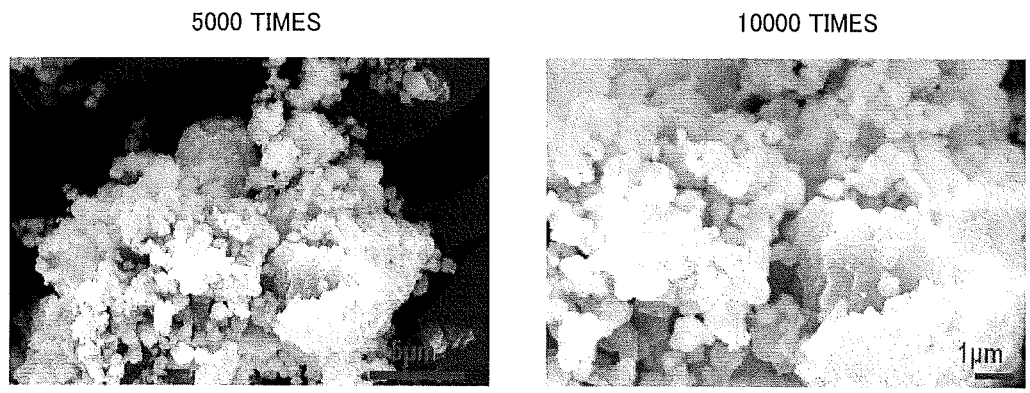
FIG. 7 is a result of observing SEM of an Na ion conductor obtained in Synthesis Example 1.

The test sample after heat treatment obtained in Synthesis Example 1 (c-NTP) was observed by using a scanning electron microscope (JSM5300™ manufactured by JEOL Ltd.). The observing conditions are accelerating voltage: 20 kV and working distance WD: 15 mm. The results are shown in FIG. 7. As shown in FIG. 7, particulates of approximately 0.2 μm were observed. Also, a state such that part of them aggregated was observed.

Example 1

Production of Active Material

Figure 3:
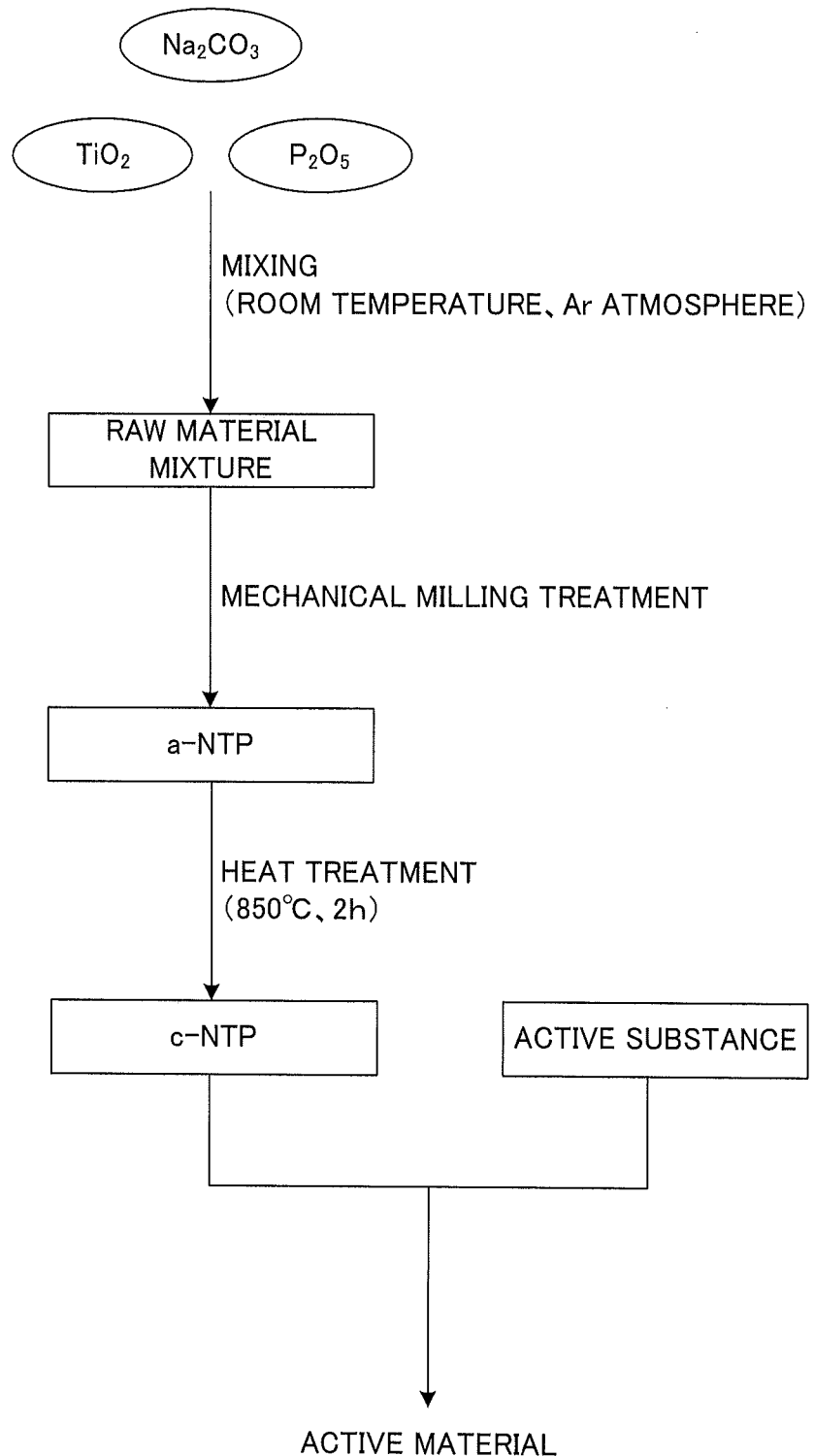
FIG. 3 is a flow chart showing an example of a producing method for an active material of the present invention.

LiNi$_{0.5}$Mn$_{1.5}$O$_4$ as an active substance and c-NTP obtained in Synthesis Example 1 were mixed at a ratio of 80:20 (weight ratio) by a dry method while using an agate mortar to obtain an active material (refer to FIG. 3).

(Production of Battery)

Figure 8:
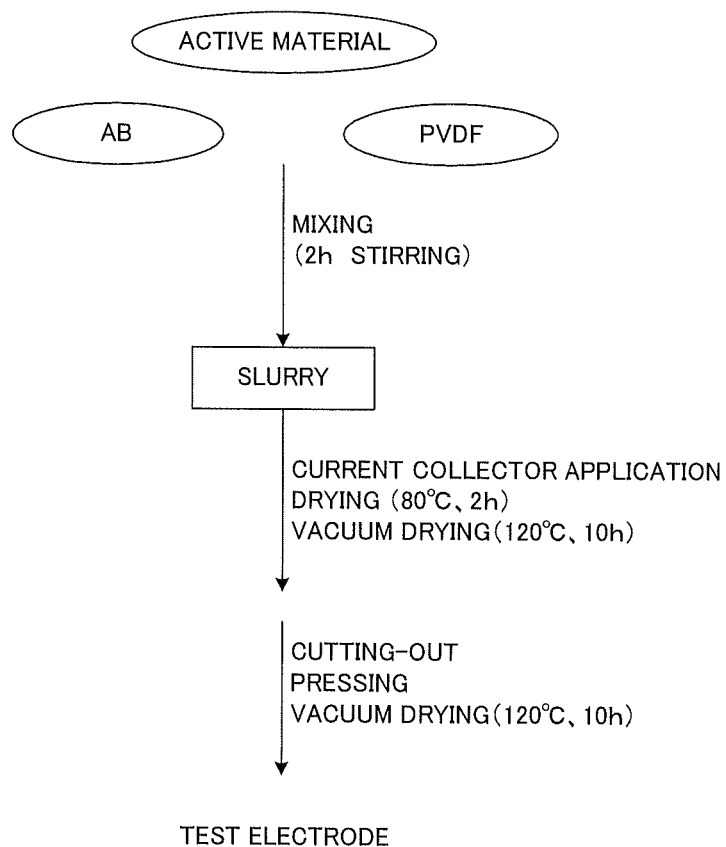
FIG. 8 is a flow chart showing an example of a producing method for a test electrode using an active material of the present invention.

An evaluation battery was produced by using the obtained active material (refer to FIG. 8). First, the obtained active material and acetylene black (AB) were mixed, and polyvinylidene fluoride (PVDF) binder dissolved in n-methylpyrrolidone (NMP) was added thereto to produce slurry. The ratio of the active material, AB and PVDF in the slurry was determined at active material:AB:PVDF 85:5:10 (weight ratio). Next, the obtained slurry was applied on an aluminum foil (15 μm thick) as a current collector by a doctor blade method, and vacuum-dried in the air at a temperature of approximately 80° C. to remove NMP. Thereafter, the slurry was vacuum-dried at a temperature of 120° C. for 10 hours. In addition, the slurry was pressed, crimped and vacuum-dried at a temperature of 120° C. for 10 hours to produce a coat-type test electrode. Incidentally, an electrode area in the test electrode was determined at 1.77 cm² (a circular form with a diameter of 1.5 cm).

Thereafter, a CR2032-type bipolar coin cell was used, the test electrode was used as a cathode layer, metallic Li was used as an anode layer, and a macroporous membrane separator of polypropylene/polyethylene/polypropylene was used as a separator. A solution such that $LiPF_6$ was dissolved at a ratio of 1.0 mol/dm³ in a solvent, in which ethylene carbonate (EC) and ethyl methyl carbonate (EMC) were mixed at EC:EMC=3:7 (volume ratio), was used for a liquid electrolyte. Thus, an evaluation battery was obtained.

Comparative Example 1

$LiNi_{0.5}Mn_{1.5}O_4$ as an active substance and acetylene black (AB) were mixed, and polyvinylidene fluoride (PVDF) binder dissolved in n-methylpyrrolidone (NMP) was added thereto to produce slurry. The ratio of the active substance, AB and PVDF in the slurry was determined at active substance:AB:PVDF=85:5:10 (weight ratio). Next, the obtained slurry was applied on an aluminum foil (15 μm thick) as a current collector by a doctor blade method, and vacuum-dried in the air at a temperature of 80° C. to remove NMP. Thereafter, the slurry was vacuum-dried at a temperature of 120° C. for 10 hours. In addition, the slurry was pressed, crimped and vacuum-dried at a temperature of 120° C. for 10 hours to produce a coat-type test electrode. Incidentally, an electrode area in the test electrode was determined at 1.77 cm² (a circular form with a diameter of 1.5 cm).

An evaluation battery was obtained in the same manner as Example 1 except for using the test electrode as a cathode layer.

Comparative Example 2

$LiNi_{0.5}Mn_{1.5}O_4$ as an active substance and c-LATP obtained in Synthesis Example 3 were mixed at 80:20 (weight ratio) to obtain an active material.

An evaluation battery was obtained in the same manner as Example 1 except for using the active material.

[Evaluations 2]

(Charge and Discharge Test)

A charge and discharge test was performed in the evaluation batteries obtained in Example 1 and Comparative Examples 1 and 2. The measurement was performed while regarding the process of desorbing Li ions from the test electrode as "charge" and the process of inserting Li ions into the test electrode as "discharge". A charge and discharge testing device (HJ-1001 SM8A™ manufactured by HOKUTO DENKO CORPORATION) was used for a measuring apparatus. The measurement conditions are as follows. The results are shown in FIGS. 9 and 10.

Potential range: 3.0 V to 5.0 V (vs. Li/Li⁺)
Temperature: 25° C.
Current value (first cycle): 0.2 mA/cm²
Current value (second cycle or later): 0.5 mA/cm²

Figure 9:
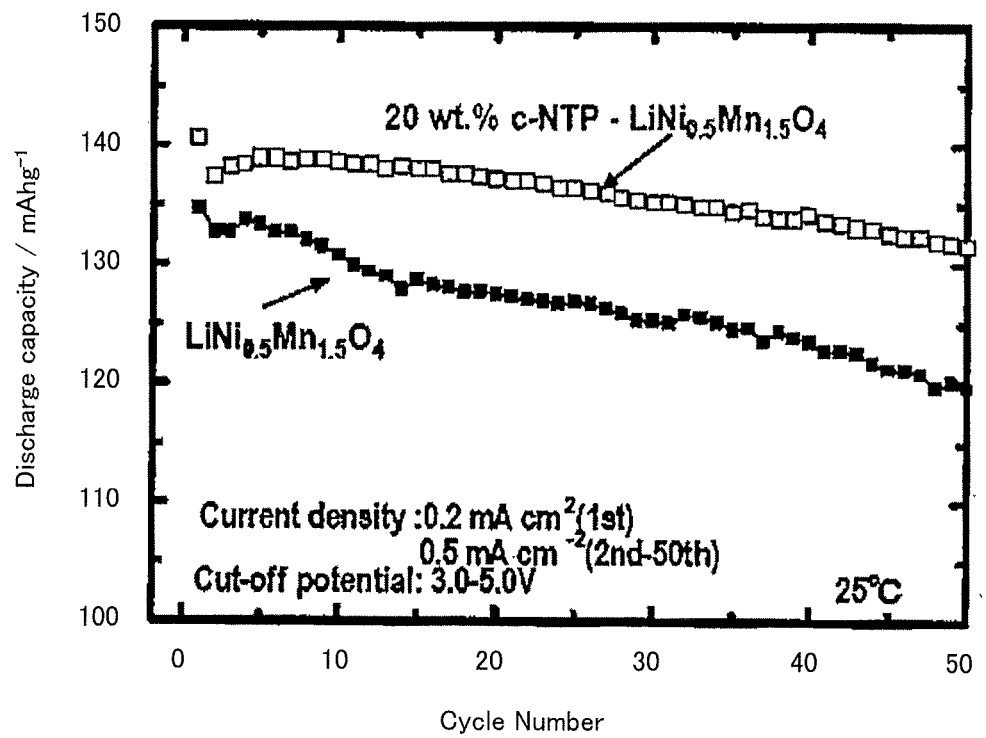
FIG. 9 is a result of a charge and discharge test of evaluation batteries obtained in Example 1 and Comparative Example 1.
Figure 10:
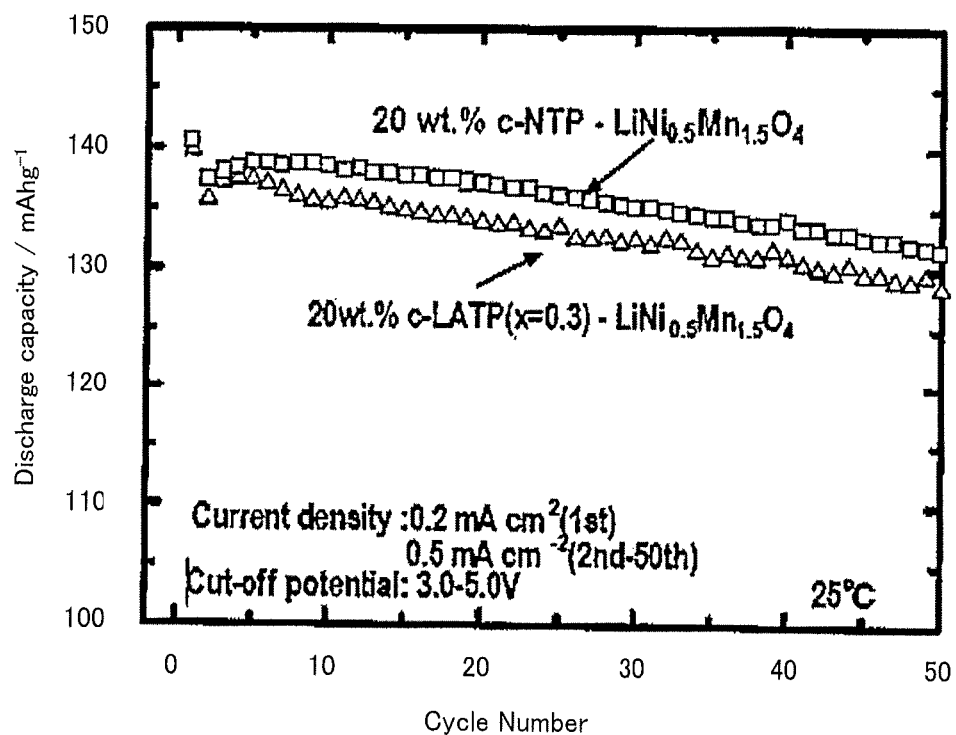
FIG. 10 is a result of a charge and discharge test of evaluation batteries obtained in Example 1 and Comparative Example 2.

As shown in FIG. 9, as compared with the evaluation battery obtained in Comparative Example 1, it was confirmed that the evaluation battery obtained in Example 1 offered so small a decrease in capacity in accordance with the increase of the number of cycles as to be capable of maintaining high capacity. Thus, it was confirmed that the disposition of an Na ion conductor on the surface of the active substance allowed cycle stability to be improved and higher capacity to be achieved. Also, as shown in FIG. 10, as compared with the evaluation battery obtained in Comparative Example 2, it was confirmed that the evaluation battery obtained in Example 1 offered high capacity despite the increase of the number of cycles, and the difference increased in accordance with the number of cycles. Thus, it was confirmed that the disposition of an Na ion conductor on the surface of the active substance allowed more favorable cycle stability.

(Cyclic Voltammetry (CV) Measurement)

Figure 11:
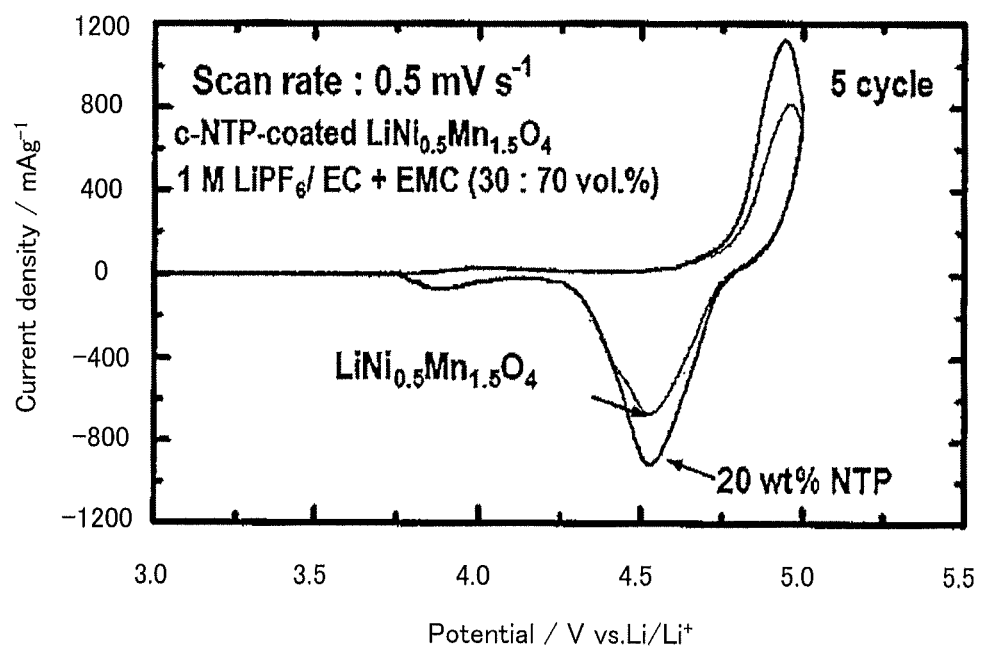
FIG. 11 is a result of measuring cyclic voltammetry (CV) of an evaluation battery obtained in Example 1.

CV measurement was performed in the evaluation batteries obtained in Example 1 and Comparative Example 1. Specifically, the first cycle was scanned from open-circuit potential to 5 V at a scan speed of 0.5 mV/S, and thereafter scanned to 3 V. CV measurement was performed for the second to fifth cycles at a potential range of 3 to 5 V. The results are shown in FIG. 11. Incidentally, the vertical axis indicates current values per unit weight of the cathode active substance $LiNi_{0.5}Mn_{1.5}O_4$. As shown in FIG. 11, it was confirmed that the evaluation battery obtained in Example 1 offered larger oxidation-reduction current values, and the peak area on the oxidation side and the reduction side increased. Thus, it is conceived that the use of the active material, in which an Na ion conductor was disposed on the surface of the active substance, allows battery capacity to be increased.

REFERENCE SIGNS LIST

1 . . . active substance
2 . . . Na ion conductor
10 . . . active material
11 . . . cathode active material layer
12 . . . anode active material layer
13 . . . electrolyte layer
14 . . . cathode current collector
15 . . . anode current collector
16 . . . battery case
20 . . . electrochemical device (lithium ion battery)

The invention claimed is:

1. An electrochemical device utilizing Li ion conduction, comprising
an active substance having an active material capable of absorbing and releasing a Li ion,
a nonaqueous liquid electrolyte, and
an Na ion conductor disposed on a surface of the active substance and having a polyanionic structure,
wherein the Na ion conductor is represented by a general formula:

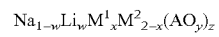

$$Na_{1-w}Li_wM^1{}_xM^2{}_{2-x}(AO_y)_z$$

where:
($M^1$ is at least one selected from the group consisting of Al, Fe, In, Cr, Sc, Ga, La, and Y;
$M^2$ is at least one selected from the group consisting of Ti, Zr, Ge, Sn, and Hf;
A is at least one selected from the group consisting of P, Si, Ti, V, W, and Nb; and
$0 \leq x \leq 1$,
$0 < y$,
$0 < z$, and
$0 \leq w < 1$.

2. The electrochemical device according to claim 1, wherein the Na ion conductor is provided with a nasicon-type crystal phase.

3. The electrochemical device according to claim 1, wherein the electrochemical device is a lithium ion battery.

4. The electrochemical device according to claim 1, wherein the active substance is a cathode active material.

5. The electrochemical device according to claim 1, wherein A is at least one selected from the group consisting of P, Si, Ti, and V.

6. The electrochemical device according to claim 1, wherein A is P.

7. The electrochemical device according to claim 1, wherein $M^1$ is at least one selected from the group consisting of Al, Fe, and In.

8. The electrochemical device according to claim 1, wherein $M^1$ is Al.

9. The electrochemical device according to claim 1, wherein $M^2$ is at least one selected from the group consisting of Ti, Zr, and Ge.

10. The electrochemical device according to claim 1, wherein $M^2$ is Ti.

11. The electrochemical device according to claim 1, wherein $M^1$ is Al, and $M^2$ is Ti.

12. The electrochemical device according to claim 1, wherein $M^1$ is Al, and $M^2$ is Zr.

13. The electrochemical device according to claim 1, wherein $0 \leq x \leq 0.4$.

14. The electrochemical device according to claim 1, wherein $M^2$ is Ti, and A is P.

* * * * *